106-18
7/30/85 XR 4,532,161

United States Patent [19]

Collins et al.

[11] Patent Number: 4,532,161
[45] Date of Patent: Jul. 30, 1985

[54] PROCESS FOR THE AQUEOUS IMPREGNATION OF GREEN WOOD WITH OIL SOLUBLE METAL SALTS

[75] Inventors: Albert V. Collins, Fairview Park; Richard W. Asmus, Lakewood, both of Ohio

[73] Assignee: Mooney Chemicals, Inc., Cleveland, Ohio

[21] Appl. No.: 598,774

[22] Filed: Apr. 19, 1984

Related U.S. Application Data

[63] Continuation of Ser. No. 418,783, Sep. 16, 1982, abandoned, which is a continuation-in-part of Ser. No. 386,659, Jun. 9, 1982, abandoned.

[51] Int. Cl.$^3$ ........................ A01N 55/02; B05D 1/18

[52] U.S. Cl. ...................................... 427/440; 106/18; 428/541; 514/494; 514/499; 514/502; 514/503; 514/505

[58] Field of Search .................. 106/18; 424/287, 289, 424/291, 293, 294, 295, 296; 427/297, 440; 428/541

[56] References Cited

U.S. PATENT DOCUMENTS

| | | | |
|---|---|---|---|
| 2,668,779 | 2/1954 | Herman | 117/59 |
| 2,951,789 | 9/1960 | McCants | 167/38.5 |
| 3,200,003 | 8/1965 | Bescher | 117/59 |
| 3,244,586 | 4/1966 | Rigterink | 167/33 |
| 3,272,693 | 9/1966 | Harrison | 167/22 |
| 3,677,805 | 7/1972 | Barnett, Jr. | 117/102 |
| 3,968,276 | 7/1976 | Allen | 427/297 |
| 4,001,400 | 1/1977 | Hager | 424/134 |
| 4,193,993 | 3/1980 | Hilditch | 424/141 |
| 4,374,852 | 2/1983 | Hilditch et al. | 424/289 |
| 4,388,215 | 6/1983 | Ishida et al. | 252/402 |

FOREIGN PATENT DOCUMENTS

| | | |
|---|---|---|
| 0005991 | 12/1979 | European Pat. Off. . |
| 756685 | 9/1956 | United Kingdom . |
| 809708 | 3/1959 | United Kingdom . |
| 972198 | 10/1964 | United Kingdom . |
| 1461630 | 1/1977 | United Kingdom . |
| 1574939 | 9/1980 | United Kingdom . |

OTHER PUBLICATIONS

*Another Big Step for Water Systems-Water-Reducible Copper and Zinc Naphthenate,* Mooney Chemicals, Inc., Jun. 1980.

Pesticide Manual, 6th Ed., p. 374, "Naphthenic Acids".

*Primary Examiner*—Michael R. Lusignan
*Attorney, Agent, or Firm*—Maky, Renner, Otto & Boisselle

[57] ABSTRACT

A process for impregnating green wood with oil-soluble metal salts is described. The method comprises (a) contacting the green wood with an aqueous system comprising
(i) water,
(ii) at least one oil-soluble metal salt of an organic carboxylic acid, and
(iii) at least one surfactant
for a period of time sufficient to enable the metal salt to penetrate into the wood, and (b) removing the wood from contact with the aqueous system. Good penetration of the metal salt into the green wood is realized by this method when conducted under vacuum, at atmospheric pressure or at elevated pressures. Preferably, the metal salt is a preservative such as a fungicide, and the aqueous system also contains other desirable components such as fire retardants, coloring agents and insecticides.

37 Claims, No Drawings

PROCESS FOR THE AQUEOUS IMPREGNATION OF GREEN WOOD WITH OIL SOLUBLE METAL SALTS

This is a continuation of application Ser. No. 418,783, filed Sept. 16, 1982, now abandoned, which is a continuation-in-part of application Ser. No. 386,659, filed June 9, 1982, now abandoned.

BACKGROUND OF THE INVENTION

The present invention relates to an inexpensive method for impregnating wood with metal salts, and more particularly, to a method for impregnating wood with preservative and fungicidal treatments.

In order to prevent decay of wood and timbers, and thereby increase their life, it is common practice to impregnate the wood or timbers with a preservative such as creosote dissolved in liquid aromatic hydrocarbons, mixtures of organic compounds which are dissolved or dispersed in water, or certain compounds which are dissolved in petroleum distillates. The protection afforded by the application of these materials is dependent upon deep and reasonably uniform penetration into the wood or timber by the preservative material. It also is desirable that the treatment be effective without a significant change in the original dimensions and surface texture of the wood or timbers.

The subject of wood treatment and wood preservation is discussed in some detail in the two volume treatise entitled "Wood Deterioration and its Prevention by Preservative Treatments", Darrel D. Nicholas, Editor, Syracuse Wood Science Series 5, Syracuse University Press, Syracuse, N.Y., 1973. Among the examples of wood preservatives described therein are various creosote compositions, pentachloro-phenol, copper naphthenate, copper-8-quinolinolate, organotin compounds, organomercury compounds, zinc naphthenate, chlorinated hydrocarbons, ammoniacal copper arsenite (ACA), acid copper chromate (ACC), zinc salts such as zinc chloride, zinc oxide and zinc sulfate, chromated copper arsenate (CCA), etc. In Volume II, Chapter 3, pages 279–298, processes and equipment for treating wood are discussed. The pressure treatment is described as the most effective method of protecting wood against attack of decay, insects, fire, etc. Non-pressure treatments also are discussed in this chapter. Dipping is suggested primarily as a satisfactory surface treatment although some penetration is observed. Another non-pressure technique is the diffusion process with unseasoned wood. The author indicates the process requires long treating periods because of slow diffusion rates.

While the literature on the subject of such wood treatments is extensive and covers a period of at least 100 years, most of the procedures which have been described for treating wood with preservatives and resin components, including pressure treatments, do not result in extensive uniform impregnation of the material into the heart of the wood and/or the procedures require a long period to effect the penetration. The problem is particularly acute when treating some types of green or incompletely seasoned wood such as soft pine.

The use of liquid aromatic hydrocarbons for preparing impregnating solvents imparts to the wood strong odors and leaves the wood with a surface which is oily and difficult to paint. Moreover, liquid aromatic hydrocarbons are flammable materials requiring special handling and safety precautions which add to the cost of the wood treatment.

Wood treated with organic preservatives dissolved in petroleum distillates have the same disadvantages as wood treated with the aromatic hydrocarbons. Using lower boiling petroleum distillates, such as mineral spirits, as the solvent, fails to eliminate the disadvantages completely. Prolonged air seasoning after treatment is frequently required to permit sufficient evaporation of the solvent if the wood is to be painted. During this period of air seasoning, a portion of the preservative can migrate to the surface of the wood with the solvent, and thus, the retention of the preservative into wood is reduced below that contemplated by the treatment.

One technique for utilizing aqueous systems of polyhalophenols is described in U.S. Pat. No. 4,090,000. Briefly, the method involves the use of an aqueous solution containing a water-soluble salt of the polyhalophenol and an acid forming material which can undergo a reaction in the solution to liberate an acid which displaces the polyhalophenol from said salt after the solution is impregnated into the wood.

Regardless of which impregnating solution is employed, the most common commercial procedure for impregnating wood involves subjecting wood to the preservative under relatively high pressures such as 150 to 200 pounds to the square inch for a substantial period of time such as from one hour to 24 hours. The process also may require relatively high temperatures such as from about 75° C. to about 90° to 95° C. Although increases in pressure tend to increase the amount of preservative absorbed by the wood, it may cause the penetration to be erratic or uneven. Moreover, the application of pressure can cause compression of the outer layers of the wood, particularly after wood is weakened and softened by steaming. The collapse of the wood cells is likely to occur especially when relatively soft, unseasoned wood of low specific gravity is being treated. On collapse of the wood cells in an area, there is formed a relatively impenetrable layer which restricts or even completely blocks the flow of preservatives into the interior of the wood.

It also has been suggested to improve the method of pressure treatment by first subjecting the wood to a vacuum treatment. Examples of prior art patents describing methods of impregnating wood utilizing a vacuum followed by pressure include U.S. Pat. Nos. 2,668,779; 3,200,003 and 3,968,276.

U.S. Pat. No. 3,677,805 describes a modification of the pressure treatment. In this procedure, the wood is immersed in a treatment liquid inside a pressure vessel, and the pressure is increased to operating pressure whereupon the contents of the vessel then are subjected to the action of a pulsating pump which provides sinusoidal pressure pulses within the vessel. In other words, pressure pulses are applied repetitively in modulated amplitude to provide variable pressure peaks above and below the ambient pressure maintained in the pressure vessel. This procedure requires equipment which includes a pulsating pump operating into a pressure vehicle equipped with a pressure release means.

The above-described prior art represents a small sampling of the suggestions which have been made for treating wood with preservative materials to prevent decay. In spite of these many suggestions made in the prior art, there continues to be a need for an inexpensive, safe, non-toxic treatment which is effective and which results in the uniform penetration of the preservatives and other chemicals to the core of the wood.

SUMMARY OF THE INVENTION

An improvement in the preservation of wood utilizing a procedure which does not require special and expensive equipment, and which results in good penetration of the treating chemicals into the wood is described. More particularly, in accordance with the present invention, a method of impregnating unseasoned and green wood with metal salts is described. This method comprises (a) contacting the green wood with an aqueous system comprising (i) water, (ii) at least one oil-soluble metal salt, and (iii) at least one surfactant, for a period of time sufficient to enable the metal salt to penetrate into the wood, and (b) removing the wood from contact with the aqueous system. Preferred metal salts are acid, neutral or basic metal salts of organic carboxylic acids. Generally, the aqueous mixture will contain less than 20% of hydrocarbon solvent and may contain optional and desirable ingredients such as flame retardants, coloring agents and insecticides. The method can be conducted under vacuum, at atmospheric or at elevated pressures.

DESCRIPTION OF THE PREFERRED EMBODIMENTS

It now has been found that good penetration of desirable treating chemicals into green or unseasoned wood is obtained by the procedure of the invention which does not require unusual or expensive equipment.

In accordance with the present invention, unseasoned or green wood can be impregnated with metal salts which, preferably, act as fungicides when incorporated into the wood. The procedure of the present invention involves an aqueous system thereby reducing, if not eliminating, the problems of many prior art processes based on organic solvents which are flammable and often toxic. Moreover, as mentioned above, the process of the present invention is applicable to unseasoned and green wood. Accordingly, the method of the invention eliminates the requirement for costly and time-consuming drying and/or seasoning procedures.

The aqueous systems utilized in the method of the invention comprise (i) water, (ii) at least one oil-soluble metal salt, and (iii) at least one surfactant.

The aqueous systems will comprise from about 50% to about 98% of water and more specifically, from about 67% to about 83% of water. Percentages of water specified herein are based either on volume or weight.

The second essential component of the aqueous systems utilized in the present invention is at least one oil-soluble metal salt. The oil-solubility of the metal salts of the invention is believed to contribute greatly to the advantageous and desirable results which are obtained. Since the organic compound is oil-soluble and essentially hydrophobic, it therefore, does not have a tendency to be extracted or leached from the treated wood even over an extended period of time.

Particularly preferred types of oil-soluble metal salts which are useful in the aqueous systems of the present invention are the acid, neutral and basic salts of organic carboxylic acids. These salts also are known in the art as "soaps".

The choice of metal contained in the salts will depend upon the properties which are desirable to be imparted to the wood being treated, availability, cost and effectiveness. Certain metals are more commonly used in the method of the invention, and these include, copper, zinc, chromium, iron, antimony, lead and mercury. Salts containing a mixture of the ions of two or more of these metals also can be used.

As mentioned, the salts can be acid, neutral or basic. The acid salts contain insufficient metal cation to neutralize the acid. The neutral salts contain an amount of metal cation just sufficient to neutralize the acidic groups present in the salt anion. The basic salts contain an excess of metal cation and are often referred to as overbased, hyperbased or superbased salts. These acid, basic and neutral salts preferably are of oil-soluble organic carboxylic acids and mixtures of such acids.

The carboxylic acids from which suitable acid, neutral and basic salts can be prepared include aliphatic, cycloaliphatic and aromatic mono- and polybasic carboxylic acids. The organic carboxylic acids can be either natural or synthetic or mixtures thereof. The examples of natural acids, although usually refined, include straight and branched chain carboxylic acids and mixtures such as tall oil acids and cyclic carboxylic acids such as naphthenic acids. A variety of synthetic carboxylic acids, and particularly aliphatic carboxylic acids or mixtures thereof is useful, and these generally contain six or more carbon atoms.

The metal salts or soaps can be prepared by fusion or precipitation methods. The soaps normally are prepared in an inert liquid medium such as a hydrocarbon oil or solvent. The organic carboxylic acids generally will have at least six carbon atoms and as many as 30 carbon atoms, but when more than one carboxylic acid is employed, carboxylic acids containing as little as two carbon atoms may be employed as one of the acids of the mixture. Examples of useful organic carboxylic acids include acetic acid, propionic acid, butyric acid, isopentanoic acid, hexoic acid, 2-ethyl butyric acid, nonylic acid, decanoic acid, 2-ethylhexoic acid, isooctanoic acid, isononanoic acid, neodecanoic acid, lauric acid, palmitic acid, stearic acid, oleic acid, linoleic acid, naphthenic acid, and commercially available mixtures of two or more carboxylic acids such as naphthenic, tall oil acids, rosin acids, etc.

Examples of acid salts are acid copper salts containing less than a stoichiometric equivalent of copper per acid equivalent. For metals other than copper, the basic salts or soaps are preferred since these contain higher amounts of metal. For example, solutions of normal zinc salts of monocarboxylic acids such as neodecanoic acid contain about 6% zinc whereas a solution of a basic zinc neodecanoate can contain up to about 16% or more of zinc.

Basic metal salts or soaps of carboxylic acids also can be prepared by methods well known in the art. Examples of neutral and basic salts and of metal salt complexes as well as their preparation can be found in, for example, U.S. Pat. Nos. 2,251,798; 2,955,949; 3,723,152 and 3,941,606 which disclosures are hereby incorporated by reference. Some of the basic salts have been referred to as complexes because they are not simple salts. For example, the basic compositions described in U.S. Pat. No. 3,941,606 are referred to as "metal carboxylate-alkoxy alcoholate" complexes. For the purpose of this invention such basic complexes are to be included in the term metal salts or soaps as used in this specification and claims.

Specific examples of the salts or soaps which are useful in the method of the invention include those described below in Table 1 and the following specific examples.

TABLE I

| | | Carboxylate Metal Salts | |
|---|---|---|---|
| Component | Metal | Metal Content (%) | Acid |
| B-1 | Cu | 16 | neodecanoic |
| B-2 | Cu | 11 | neodecanoic |
| B-3 | Cu | 6 | naphthenic |
| B-4 | Zn | 18 | 2-ethyl hexoic |
| B-5 | Zn | 8 | napthenic |
| B-6 | Zn | 10 | mixture of $C_8$-$C_{13}$ |

The preparation of the above-described metal salts is illustrated by the following examples.

EXAMPLE B-1

A mixture of 260 parts of crude neodecanoic acid, 103 parts of propionic acid, 400 parts of mineral spirits, 172 parts of copper powder, 91 parts of Methyl Cellosolve, 14 parts of dipropylene glycol, 70 parts of water, 10 parts of octyl-phenoxy polyethoxy ethanol (Triton X-15 from Rohm & Haas Company) and 3 parts of Santoflex-77 is prepared and sparged with air while heating to a temperature of about 80° C. Reaction under these conditions continues for about 6 hours. A small amount of boric acid (7 parts) is added and the heating is continued at 80° C. with air sparging. The reaction is continued at this temperature until 180% acid neutralization is achieved (total, 14 hours). The mixture is heated for an additional 2 hours at a temperature of about 150° C. to 190% acid neutralization. The air blowing is terminated, and an inert nitrogen atmosphere is employed while the mixture is slowly heated to about 150° C. over a period of 8 hours while excess water is removed.

Four approximately equal proportions of amyl phosphate totalling 176 parts are added at 3-hour intervals while maintaining a temperature of about 145° C. and a nitrogen atmosphere. The mixture then is cooled to about 125° C., settled to remove excess copper and filtered.

The filtered product can be heated under vacuum to a temperature of about 150° C. in order to remove the mineral spirits to yield the desired concentration of metal.

The remaining component examples B-2 through B-6 in Table I can be prepared methods similar to those described above for B-1 or by alternative procedures known in the art.

EXAMPLE B-7

A mixture of 840 parts of distilled naphthenic acid, 176 parts of 2-ethyl hexoic acid, 512 parts of mineral spirits, 48 parts of Carbitol (a diethylene glycol ether available commercially from Union Carbide Corp.), 4.8 parts of acetic acid, 1.6 parts of water and 10.9 parts of an anti-foam agent is charged to a reactor, and the mixture is heated with agitation to a temperature of about 65° C. The mixture is sparged with carbon dioxide and 214.4 parts of zinc oxide are added to the mixture which is then heated to a temperature of about 105° C. The reaction is continued at this temperature while periodic checks are made for percent zinc, the acid value and percent water. If necessary, the acid value is adjusted to minus 33 to minus 38 for 10% zinc. If the water content is over 0.4%, the mixture is dehydrated.

About 100 parts of filter aid are added with stirring to the mixture which is then filtered. The filtrate is a clear liquid which is adjusted to a zinc content of 10% using mineral spirits.

Carboxylate metal salts of the type described above are available commercially such as from Mooney Chemicals, Inc., Cleveland, Ohio, 44113 under the general trade designations TEN-CEM, CEM-ALL, NAP-ALL, HEX-CEM, LIN-ALL, and NEO-NAP. These mineral spirit solutions can be adapted for use in preparing the aqueous systems of the present invention by adjusting the mineral spirits content (generally reducing the amount of mineral spirits) and mixing said mineral spirit solutions with water and surfactants as described below.

Water dispersable solutions/dispersions of metal salts also are available from Mooney Chemicals, Inc. under the general trade designation HYDRO-NAP TM. The metal content of these salts also ranges from about 4% to about 10%, but these solutions/dispersions already contain the desired surfactants and can be readily mixed with water to form the desired aqueous systems. Mixtures of the carboxylic acid salts such as those described in Table I are easily prepared and utilized in accordance with the invention. For example, a mixture in accordance with the invention is prepared from equal parts of components B-1 and B-6 resulting in a mixture containing 8% copper and 5% zinc. A mixture of two parts of component B-1 with one part of component B-6 will contain 10.7% copper and 3.3% of zinc.

Examples of other neutral and basic salts include lead naphthenate, lead neodecanoate, lead 2-ethyl hexoate, lead tallate, zinc tallate, chromium 2-ethyl hexoate, chromium tallate, chromium oleate, antimony octoate, antimony oleate, iron naphthenate, iron tallate, phenyl mercury oleate, mercury dioleate, etc.

In addition to the metal salts and soaps described above, the aqueous systems utilized in the method of the invention also contain at least one surfactant. Preferably, the surfactants are anionic or nonionic surfactants. Many such surfactants are known in the art. See, for example, McCutcheon's "Detergents and Emulsifiers", 1979, North American Edition, published by McCutcheon's Division, MC Publishing Corporation, Glen Rock, N.J., U.S.A., particularly pages 15-20 which are hereby incorporated by reference for their disclosure in this regard.

In general, the nonionic surfactants such as those containing ether linkages are particularly useful. Examples of such ether-containing surfactants are those having the general formula $$R_1—O—[(CH_2)_nO]_xH$$

wherein $R_1$ is an aryl or alkyl group containing from about 6 to 20 carbon atoms, n is two or three, and x is an integer between 2 and 100. Such surfactants are produced generally by treating fatty alcohols or alkyl-substituted phenols with excess ethylene oxide or propylene oxide. The alkyl carbon chain may contain from about 14 to 24 carbon atoms and may be derived from a long chain fatty alcohol such as oleyl alcohol or stearyl alcohol.

Nonionic polyoxyethylene compounds of this type are described in U.S. Pat. No. 3,855,085. Such polyoxyethylene compounds are available commercially under the general trade designations "Surfynol" by Air Products and Chemicals, Inc. of Allentown, Pa., and under the designation "Pluronic" or "Tetronic" by BASF Wyandotte Corp. of Wyandotte, Mich. Examples of specific polyoxyethylene condensation products include "Surfynol 465" which is a product obtained by reacting about 10 moles of ethylene oxide with 1 mole of tetramethyldecynediol. "Surfynol 485" is the product obtained by reacting 30 moles of ethylene oxide with tetramethyldecynediol. "Pluronic L 35" is a product obtained by reacting 22 moles of ethylene oxide with polypropylene glycol obtained by the condensation of 16 moles of propylene oxide. Also useful is Atlox 1045A from ICI America, Inc. which is a polyoxyalkylene sorbitol oleate-laurate mixture.

Amine, long chain fatty amine, long chain fatty acid, alkanol amines, diamines, amides, alkanol amides and polyglycol-type surfactants known in the art are also useful. One type found particularly useful is the group obtained by the addition of a mixture of propylene oxide and ethylene oxide to diamines. More specifically, compounds formed by the addition of propylene oxide to ethylene diamine followed by the addition of ethylene oxide are useful and are available commercially from BASF Wyandotte Inc. Chemical Group under the general trade designation "Tetronic".

Carbowax-type wetting agents which are polyethylene glycols having different molecular weights have been found to give good results. For example Carbowax No. 1000 has a molecular weight range of from about 950 to 1,050 and contains from 20 to 24 ethoxy units per molecule. Carbowax No. 4000 has a molecular weight range of from about 3000 to 3700 and contains from 68 to 85 ethoxy units per molecule. Other known nonionic glycol derivatives such as polyalkylene glycol ethers and methoxy polyethylene glycols which are available commercially can be utilized as surfactants in the compositions of the invention.

Anionic surfactants also are useful in the aqueous systems of the invention. Among the useful anionic surfactants are the widely-known metal carboxylate soaps, organo sulfates, sulfonates, sulfocarboxylic acids and their salts, and phosphates. Various anionic surfactants are readily available commercially, and further information about anionic surfactants can be found in the text "Anionic Surfactants" Parts II and III, edited by W. M. Linfield, published by Marcel Dekker, Inc., New York, 1976. Examples of anionic surfactants available from ICI America, Inc. include Atlas G-2205 which is an aromatic phosphate and Atlas G-3300 which is an alkyl aryl sulfonate. Examples of anionic surfactants available from Rohm and Haas Company include Triton 770 which is a sodium salt of an alkyl aryl polyether sulfate, Triton GR-5M which is a dioctyl sodium sulfosuccinate, Triton H-55 which is a phosphate surfactant, potassium salt, Triton W-30 and Triton X-200 which are sodium salts of alkyl aryl polyether sulfonates, etc.

Mixtures of the nonionic and anionic surfactants can and are generally utilized in the aqueous systems of the present invention. The amount of surfactant contained in the aqueous mixture can vary over a wide range, but is generally from 0.25% to about 7.5% and more preferably between 1% and 5%. Percent may be based on weight or volume.

The aqueous systems of the present invention generally contain at least about 67% of water and less than about 20% of hydrocarbon solvents. Preferably, the amount of hydrocarbon solvent contained in the aqueous mixture is maintained at a minimum and will generally be less than about 15% of the aqueous system. The metal content of the aqueous system may vary from about 0.2 to about 10% by weight. The percentages of water and hydrocarbon solvents stated herein are either on a weight or volume basis.

The aqueous systems of the present invention can be prepared by mixing the metal salt and the surfactants with sufficient water to provide the desired levels of ingredients. Alternatively, and more preferably, the aqueous systems are prepared from water-dispersable additive concentrates which contain the desired metal salt, one or more surfactants and a hydrocarbon solvent. As mentioned above, such additive concentrates are available commercially such as from Mooney Chemicals, Inc. under the general trade designation HYDRO-NAP. Moreover, such water-dispersable additive concentrates can be prepared from commercially available solutions of metal salts and mineral spirits and by blending the mineral spirit solutions with the desired surfactants with or without additional hydrocarbon solvents such as mineral oils. For example, a water-dispersable additive concentrate can be prepared from the metal salt solutions in mineral spirits illustrated above as Examples B-1 to B-7 by thoroughly mixing the mineral spirit solutions with mineral oil and surfactants. A specific example of such a procedure is the blending of 800 parts of the product of Example B-7 with 100 parts of mineral oil, 75 parts of Atlas G-3300 and 25 parts of Atlox-1045A. Similar water-dispersable additive concentrates can be prepared from compositions identified as B-1 to B-7 utilizing the same or other surfactants.

The water-dispersable additive concentrates of the types described above can be converted to the aqueous systems utilized in the invention by dilution with water. This dilution usually is accomplished by standard mixing techniques. This offers a convenient procedure since the additive concentrate can be shipped to the point of use before the water is added, thereby reducing the cost of shipping.

The aqueous systems of the present invention also may contain other additives which impart desirable properties to the treated wood. For example, the aqueous systems of the invention may contain (v) flame retardant compositions, (vi) coloring agents, (vii) insecticides and (viii) odorants. Generally, these additives can be included in the aqueous systems of the invention in the disperse phase or dissolved in the water. The amount of such additives included in the aqueous systems of the invention may vary over a rather wide range although amounts of from about 0.5 to about 5% of these compositions generally is satisfactory.

Inorganic fire retardant compositions are particularly useful in the aqueous systems of the invention. Examples of inorganic materials include diammonium phosphate, monoammonium phosphate, ammonium chloride, ammonium sulfate, borax and zinc chloride. Examples of organic fire retardants include a number of halogenated and organophosphorus compounds which either may be dispersed in the aqueous systems as mentioned above or rendered soluble by forming water-soluble salts or solutions of the fire retardants which can then be mixed with the water-dispersible additive concentrates or the aqueous systems of the invention. For example, ammonium salts of organophosphorus compounds may be employed in the aqueous systems of the invention. In particular, examples include ammonium salts of bis-dibromo propyl phosphate, diethyl phosphate, bis(beta-chloroethyl)phosphate, bis(1,3-dichloropropyl)phosphate, etc. Other water-soluble organic fire retardants include aliphatic carboxylic acids containing over 50% organically bound bromine, alkyl sulfamates, ammonium alkyl phosphates, antimony trichloride with tertiary amines such as ethanol amines, urea with ammonium phosphate and urea with sulfamic acid.

Although the various types of green wood which can be treated in accordance with the method of the invention generally have a satisfactory appearance for most purposes, the appearance can be modified if desired by imparting different color effects. The present invention contemplates the inclusion in the aqueous systems of coloring agents which either are soluble or dispersable in the aqueous systems of the invention. Any of the known oil-soluble, water-soluble or water dispersable coloring agents can be used. These agents are mixed either with the water dispersable additive concentrates of metal salts described above, or the aqueous systems, and when the wood is immersed in the aqueous systems of the invention containing coloring agents, the coloring agents penetrate the wood with the metal salts give desirable coloring effects which in many instances emphasize the grain of the wood. Examples of coloring agents which may be used depending on the desired results include: Bruco Creosote Brown RGY available from Bruce Chemical Co., Iron Cem-All available from Mooney Chemical Inc., and Pylaklor Red Brown LX-6249 available from Pylam Dye Co.

Insecticides also can be included in the aqueous systems of the invention, and it is preferable that the insecticide either be soluble in oil, water or readily dispersable in water. Examples of such insecticides include Dursban TC available from Dow Chemical and Ficam 76WP available from BFC Chemicals Inc.

Odorants can be included in the aqueous systems of the invention, and one preferred odorant is pine oil. Other water-soluble or dispersable compounds having desired odors can be included in the aqueous systems.

The process of this invention involves contacting the green wood with the aqueous systems a period of time sufficient to enable the desired amount of metal salt to penetrate into the wood. Contact between the wood and the aqueous system can be effected by brushing, spraying, painting, immersing, etc. One of the surprising features and advantages of the present invention is that excellent results have been obtained when the green wood is immersed in aqueous systems containing as little as 2% of metal for periods of as little as 5 to 10 minutes. Moreover, subsequent analysis of the green wood treated in accordance with this procedure reveals an excellent metal salt pick-up with exceedingly good penetration of the metal salt into the wood.

In one method of the present invention, the aqueous system in which the green wood is immersed can be maintained at a temperature of from about 5° to about 95° C. at atmospheric pressure. However, the method of the invention can be, and is preferably carried out at ambient temperature thereby eliminating the need for any equipment or materials for heating or cooling the aqueous systems. In some instances, it may be advantageous to heat the aqueous systems to elevated temperatures to increase the rate of penetration.

As mentioned above, after the green wood has been contacted with the aqueous systems of the present invention for the desired period of time, the wood is removed from contact with the aqueous system. The thus treated green wood is ready for shipping, although it may be desirable in some instances to allow the wood to at least partially dry before shipping.

It is surprising that desirable results can be obtained with such short contact times of the wood and aqueous systems. It is believed that the aqueous systems used in this invention deposit the desired amount of material on and in the outer layers of the wood during the brief contact to provide the desired results even though the metal salts and other additives have not completed the penetration process into the wood. After the treated logs are removed from the aqueous system, the salts and other additives continue to penetrate into the wood while the wood is in storage or in shipment. Accordingly this invention provides a method for treating wood which not only uses inexpensive equipment (such as a large open tank), but a method by which the wood to be treated is in the equipment for short periods of time.

The method of the invention also can be conducted on wood contained in an enclosed vessel under vacuum or pressure conditions or a combination thereof. The use of pressure for improving the penetration of various chemicals into all types of wood is well known in the art. In this technique, the green wood is placed in a chamber which is sealed and evacuated in a regulated cycle which is related to and determined from a consideration of the species of wood. Generally, the period of evacuation will vary from about 15 minutes to one hour and the pressure within the sealed chamber is brought to a level of about two inches of mercury or less. The purpose of this step is to remove air and wood volatiles from the wood. The diluted aqueous systems of the invention then are introduced into the enclosed container, and the amount of composition should be sufficient to immerse the wood completely. Pressurization of the vessel is then initiated and the pressure maintained at a desired level for a given period of time. Initially, the pressure within the vessel will decrease as the aqueous system within the container penetrates into the wood. The pressure can be raised to maintain a desirable level throughout the penetration period of treatment. Stabilization of the pressure within the vessel is an indication that there is no longer any penetration of the liquid into the wood. At this point, the pressure can be released, the vessel drained, and the wood removed.

The details of the pressure process, including pressure ranges, concentration of aqueous composition and the cycling of vacuum and pressure with respect to a particular species of wood can be readily determined by one skilled in the art from the examples which follow and also by following the procedure of this invention on the particular wood while varying process parameters to provide optimum results. For example, the pressures utilized in the above-described pressure method can be as high as 300 psig., and are generally from about 50 to 250 psig.

The method of the invention can be carried out on a wide variety of wood types. The actual time of contact of the green wood with the aqueous systems of the invention will vary depending on the amount of metal salt to be introduced into the wood and the difficulty of penetration into the various types. Examples of wood species which can be treated in accordance with the method of the invention include Western Red Cedar, Douglas Fir, Spruce, Sugar Maple, Ash, Walnut, Cherry, White Pine, Red Pine, Birch, Red Oak, Elm, Hickory and Linden. Green wood generally is defined in the industry as wood containing 30% or more by weight of water based on bone dry wood.

The following is a specific example of the method of the invention conducted at atmospheric pressure in an open tank.

EXAMPLE A

Logs (debarked) are immersed in an aqueous system prepared by diluting zinc Hydro-Nap TM available from Mooney Chemicals, Inc. and containing 8% zinc as zinc naphthenate with water and stirring to provide an aqueous system containing about 2.67% zinc. The aqueous system is maintained at ambient temperature, and the wood logs are immersed in the aqueous system for about 6 minutes. The logs then are removed from the aqueous system and allowed to drip dry. Examination of the log specimens treated in accordance with this procedure shows good zinc pick-up and retention. Moreover, subsequent examination of the log specimens treated in accordance with this procedure shows excellent penetration of the zinc salt into the logs, and there is no significant change in the original dimensions and surface texture of the wood. The metal salts which have penetrated into the wood logs exhibit resistance to leaching by water.

The following are specific examples of the method of the invention conducted at elevated pressures in an enclosed vessel.

EXAMPLE B

Green Norway pine logs are pressure treated with an aqueous system prepared by diluting Zinc Hydro-Nap (Mooney Chemicals) containing 8% zinc as zinc naphthenate with sufficient water to provide an aqueous system containing about 0.57% of zinc. The logs are immersed in the system in an enclosed pressure vessel. The pressure treatment is conducted at a maximum pressure of 270 psig for a total pressure time of about one hour. The logs are then removed from the vessel and allowed to drip dry. The logs treated in this manner contain zinc which exhibits good retention properties.

EXAMPLE C

The procedure of Example B is repeated except that the diluted aqueous system contains 0.39% of zinc as zinc naphthenate and the maximum pressure is 300 psig during a treating period of about 2 hours. The weight increase of the logs after treatment is about 38%.

We claim:

1. A method of impregnating green wood with metal salts which comprises (a) contacting the green wood with an aqueous system comprising
  (i) at least 50% by weight of water,
  (ii) a fungicidally effective amount of at least one oil-soluble metal salt of an organic carboxylic acid and
  (iii) an effective amount of at least one surfactant for a period of time sufficient to enable the metal salt to penetrate into the wood, and (b) removing the wood from contact with the aqueous system.

2. The method of claim 1 wherein the metal content in the aqueous mixture is from about 0.2 to 10% by weight.

3. The method of claim 1 wherein the metal of the metal salt is zinc, copper, chromium, iron, antimony, lead or mercury or a mixture thereof.

4. The method of claim 1 wherein the acid is at least one aliphatic or alicyclic monocarboxylic acid containing from about six to about 30 carbon atoms.

5. The method of claim 4 wherein the salt is a basic salt or a mixture of basic salts.

6. The method of claim 1 wherein the salt is at least one acid copper salt.

7. The method of claim 1 wherein the salt is a zinc salt or a mixture of a copper salt and a zinc salt.

8. The method of claim 1 wherein the green wood is immersed in an aqueous system maintained at the temperature of between about 5° C. and 95° C.

9. The method of claim 8 wherein the temperature of the aqueous system is ambient temperature.

10. The method of claim 1 wherein the aqueous system contains anionic or nonionic surfactants or mixtures thereof.

11. The method of claim 1 wherein the wood is immersed in the aqueous system at atmospheric pressure.

12. The method of claim 1 wherein the wood is immersed in the aqueous system and maintained in the system under fluid pressure in an enclosed pressure vessel.

13. The method of claim 12 wherein the pressure within the vessel is increased to and maintained at a level of about 150 to 275 pounds per square inch for a period of time sufficient to cause the aqueous system to penetrate into the wood.

14. The method of claim 13 wherein the pressure is maintained between 150–275 pounds per square inch for a period of about 15 to 60 minutes.

15. The method of claim 10 wherein the surfactant comprises a mixture of anionic and nonionic surfactants.

16. The method of claim 1 wherein the metal salt is a fungicide.

17. The method of claim 1 wherein the aqueous system contains (iv) less than 20% by weight of a hydrocarbon solvent.

18. The method of claim 1 wherein the aqueous system also contains (v) a flame retardant.

19. The method of claim 1 wherein the aqueous system also contains (vi) a coloring agent.

20. The method of claim 1 wherein the aqueous system also contains (vii) an insecticide.

21. A method of impregnating green wood with metal salts which comprises (a) immersing the green wood in an aqueous system comprising
  (i) at least 50% by weight of water,
  (ii) at least one oil-soluble acid, neutral or basic metal salt of one or more organic carboxylic acids, wherein the metal salt is present in the aqueous mixture in an amount sufficient to provide a metal content of from about 0.2 to 10% by weight,
  (iii) from about 0.25 to about 7.5% by weight of at least one anionic or nonionic surfactant, and
  (iv) less than 20% by weight of a hydrocarbon solvent for a period of time sufficient to enable the metal salt to penetrate into the wood, (b) removing the wood from the aqueous system.

22. The method of claim 21 wherein the green wood is immersed in the aqueous system at atmospheric pressure.

23. The method of claim 21 wherein the green wood is immersed in the aqueous system under fluid pressure in an enclosed vessel.

24. The method of claim 23 wherein the pressure within the vessel is increased to and maintained at a level of about 150 to 275 pounds per square inch.

25. The method of claim 24 wherein the pressure is maintained at about 150 to 275 pounds per square inch for a period of about 15 to 60 minutes.

26. The method of claim 21 wherein the aqueous system is a dispersion.

27. The method of claim 21 wherein the organic carboxylic acid is an aliphatic or alicyclic monocarboxylic acid having from about 6 to 30 carbon atoms, and the salt is a basic salt or a mixture of basic salts.

28. The method of claim 21 wherein the organic carboxylic acid is an aliphatic or alicyclic monocarboxylic acid having from about 6 to 30 carbon atoms, and the salt is a copper salt or a mixture of a copper salt and a zinc salt.

29. The method of claim 21 wherein the aqueous system is maintained within a temperature of between about 5° C. and 95° C.

30. The method of claim 21 wherein the metal salt is at least one metal salt of an aliphatic or alicyclic monocarboxylic acid wherein the metal is copper, zinc, chromium, iron, antimony, lead or mercury.

31. The method of claim 30 wherein the metal is copper or zinc.

32. The method of claim 21 wherein the aqueous system also contains (v) a flame-retardant.

33. The method of claim 21 wherein the aqueous system also contains (vi) a coloring agent.

34. The method of claim 21 wherein the aqueous system also contains (vii) an insecticide.

35. The method of claim 1 wherein the green wood are pieces of green wood.

36. The method of claim 1 wherein the aqueous system (a) is substantially free of ammonia.

37. The method of claim 21 wherein the aqueous system is substantially free of ammonia.

* * * * *